No. 649,835. Patented May 15, 1900.
S. GRAY.
SHADE BRACKET.
(Application filed Mar. 7, 1899.)
(No Model.)
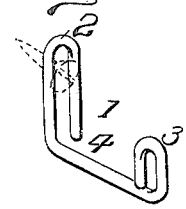
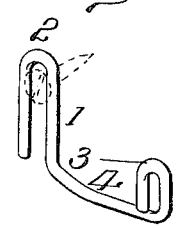
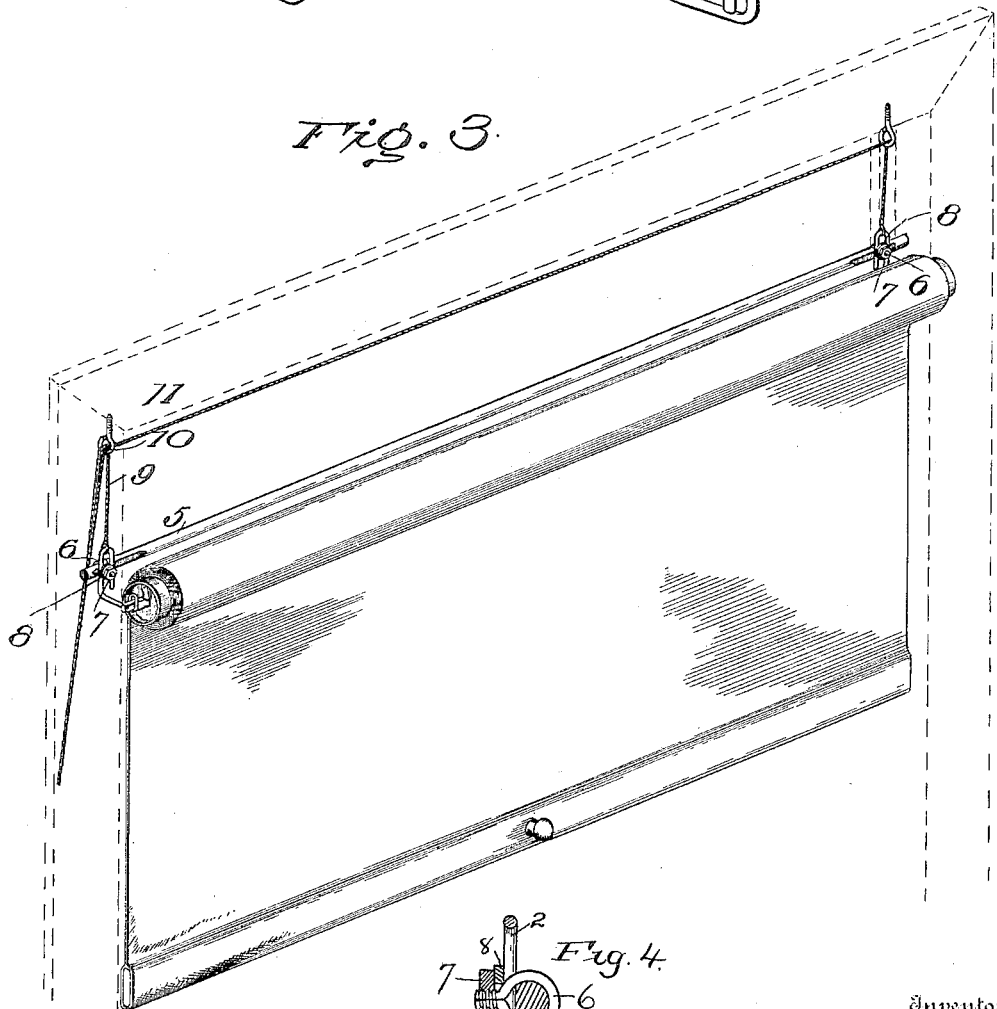
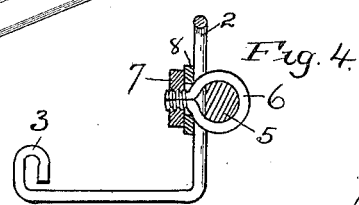
Witnesses
Inventor
Samuel Gray
By T. J. W. Robertson
Attorney

UNITED STATES PATENT OFFICE.

SAMUEL GRAY, OF HARRISBURG, PENNSYLVANIA.

SHADE-BRACKET.

SPECIFICATION forming part of Letters Patent No. 649,835, dated May 15, 1900.

Application filed March 7, 1899. Serial No. 708,135. (No model.)

*To all whom it may concern:*

Be it known that I, SAMUEL GRAY, a citizen of the United States, residing at Harrisburg, in the county of Dauphin and State of Pennsylvania, have invented a certain new and useful Improvement in Shade-Brackets, of which the following is a specification, reference being had to the accompanying drawings.

This invention relates to that class of shade-brackets formed of wire; and its object is to provide brackets of this class that can be readily attached to the frame of a window or be adjustably fastened to a bar, so as to be raised or lowered by cords passed through eyes on the frame.

To these ends the invention consists in the peculiar construction hereinafter more particularly described and then definitely claimed at the end hereof.

In the accompanying drawings, Figure 1 shows a perspective view of one form of my bracket. Fig. 2 shows a similar view of a different form. Fig. 3 shows a similar view of a pair of brackets adjustably attached to a bar and hung by cords to a window-frame. Fig. 4 is a vertical section through the center of one of the hangers and its fastening device.

Referring now to the details of the drawings by numerals, Fig. 1 indicates a bracket adapted to be screwed on the face of a window-frame and is provided with two loops 2 and 3, connected by an arm 4. The upper loop 2 is made long, so as to allow of adjustment up or down, so as to make the shade-roller horizontal when the bracket is in position. The long loop has the further advantage over a round loop that it will allow of two screws being used to fasten it in position. The other loop 3 is oblong, so as to receive and hold the flattened end of the stationary pivot of a spring-roller; but the other bracket of a pair may of course have a round hole or loop to receive the revolving pivot. The arm 4 should be of sufficient length to keep the shade well away from the window.

It will be seen that the openings in the loops in the bracket shown in Fig. 1 are at right angles to each other; but in Fig. 2 the loops are in substantially the same plane, so as to be fastened to the side of a window-frame. The arm is preferably bent, so as to carry the loop a little to one side to prevent the roller or shade coming in contact with it.

In Fig. 3 I show brackets like that illustrated in Fig. 1 attached to a bar 5 by means of a screw-eye 6, which is held firmly by a nut 7, the screw-eye and nut rigidly holding the bracket in any desired position on the bar 5, so that the brackets can be held at suitable distances apart to accommodate the different sizes of rollers and shades. For convenience in screwing up the nut a washer 8 is interposed between the loop and nut; but this is not absolutely necessary.

Cords (indicated by 9) are tied in the loops 2 and pass through eyes 10, screwed into the frame 11, in a manner well understood, and therefore need no further description.

From the above description and the drawings it will be seen that my brackets may not only be cheaply made, but will be found very convenient and can be used in different ways. They can be made so as to fasten on the face of a window or on the side of the same, as desired, or can be attached to a bar, so as to be raised and lowered at will.

What I claim as new is—

The combination with a bar 5, having a partially-flattened side, and a bracket having one loop 3 adapted to receive the flattened pivot of a spring-roller, and a second loop 2 having its opening at right angles to the opening in the first-mentioned loop, and of sufficient length to admit of vertical adjustment, with a screw-eye encircling said bar and passing through the loop 2, and a nut 7 to secure the parts together, substantially as described.

In testimony whereof I affix my signature, in the presence of two witnesses, this 4th day of March, 1899.

SAMUEL GRAY.

Witnesses:
CHAS. H. HOLLINGER,
FREDERICK M. OTT.